US012266333B2

(12) United States Patent
Lee et al.

(10) Patent No.: US 12,266,333 B2
(45) Date of Patent: Apr. 1, 2025

(54) MATCHING MEDIA FOR PERFECT TRANSMISSION OF ULTRASONIC WAVES

(71) Applicants: Seoul National University R&DB Foundation, Seoul (KR); CENTER FOR ADVANCED META-MATERIALS, Daejeon (KR)

(72) Inventors: Jeseung Lee, Anyang-si (KR); Jooa Park, Suwon-si (KR); Yoon Young Kim, Seoul (KR)

(73) Assignees: SEOUL NATIONAL UNIVERSITY R&DB FOUNDATION, Seoul (KR); CENTER FOR ADVANCED META-MATERIALS, Daejeon (KR)

( * ) Notice: Subject to any disclaimer, the term of this patent is extended or adjusted under 35 U.S.C. 154(b) by 395 days.

(21) Appl. No.: 17/882,883

(22) Filed: Aug. 8, 2022

(65) Prior Publication Data
US 2023/0054652 A1 Feb. 23, 2023

(30) Foreign Application Priority Data

Aug. 18, 2021 (KR) .................. 10-2021-0108869

(51) Int. Cl.
*G01K 11/02* (2006.01)
*G01N 29/28* (2006.01)
(Continued)

(52) U.S. Cl.
CPC ............. *G10K 11/02* (2013.01); *G01N 29/28* (2013.01)

(58) Field of Classification Search
CPC ........ G10K 11/00; G10K 11/02; G01N 29/00; G01N 29/22; G01N 29/24; G01N 29/28;
(Continued)

(56) References Cited

U.S. PATENT DOCUMENTS

| 6,607,491 | B2 * | 8/2003 | Sato | G10K 11/02 |
| | | | | 600/459 |
| 7,224,104 | B2 * | 5/2007 | Shibamoto | G01N 29/28 |
| | | | | 310/334 |
| 9,186,126 | B2 * | 11/2015 | Kusukame | A61B 8/4444 |

FOREIGN PATENT DOCUMENTS

| JP | 2003111182 A | * | 4/2003 | ............. G10K 11/02 |
| JP | 2014204387 A | * | 10/2014 | ............. H04R 17/00 |

(Continued)

OTHER PUBLICATIONS

Machine Translation of JP-2003111182-A (Year: 2003).*
(Continued)

*Primary Examiner* — Nguyen Q. Ha
(74) *Attorney, Agent, or Firm* — LEX IP MEISTER, PLLC

(57) ABSTRACT

An exemplary embodiment provides matching media for perfect transmission of ultrasonic waves by easily implementing perfect transmission of ultrasonic waves at a boundary between different elastic media through a matching layer provided at the boundary between the different elastic media and proposes a matching layer having a single layer structure of a simple single pattern that is easily processed, thereby easily implementing effects such as miniaturization of the matching layer, reduction of manufacturing cost, and improvement of manufacturability. The matching medium for perfect transmission of ultrasonic waves according to an exemplary embodiment includes a matching layer that is provided with a single pattern under a perfect transmission condition at a boundary between an incident medium and a transmission medium to perfectly transmit the ultrasonic waves incident from the incident medium to the transmission medium, wherein the matching layer forms a single pattern by controlling a plurality of predetermined design variables.

9 Claims, 12 Drawing Sheets

(51) Int. Cl.
  *G10K 11/02*   (2006.01)
  *H04R 1/30*   (2006.01)
  *H04R 1/32*   (2006.01)
(58) Field of Classification Search
  CPC ... H04R 1/00; H04R 1/22; H04R 1/30; H04R 1/32–34
  See application file for complete search history.

(56)                References Cited

FOREIGN PATENT DOCUMENTS

| KR | 10-2011-0062219 | 6/2011 |
| KR | 10-1856201 | 5/2018 |
| KR | 10-2020-0127847 | 11/2020 |

OTHER PUBLICATIONS

Machine Translation of JP-2014204387-A (Year: 2014).*
Metamaterial—Wikipedia (Year: 2024).*
Lee, Jeseung, et al. "Perfect transmission of elastic waves obliquely incident at solid-solid interfaces." Extreme Mechanics Letters 51 (2022): 101606, Jan. 12, 2022.

* cited by examiner

MATCHING MEDIA FOR PERFECT TRANSMISSION OF ULTRASONIC WAVES

CROSS-REFERENCE TO RELATED APPLICATION

This application claims priority to and the benefit of Korean Patent Application No. 10-2021-0108869 filed in the Korean Intellectual Property Office on Aug. 18, 2021, the entire contents of which are incorporated herein by reference.

BACKGROUND OF THE INVENTION (a) Field of the Invention

Matching media for perfect transmission of ultrasonic waves is provided.

(b) Description of the Related Art

Transmission of ultrasonic waves with high energy efficiency at a boundary between different elastic media is one of important issues in the ultrasonic industry. When the ultrasonic waves are incident from one medium to the other medium, in general, only some of incident wave energy is transmitted and some thereof is reflected. These inevitably generated reflected waves have acted as obstacles in the development of high-efficiency ultrasonic equipment.

As a method of increasing the ultrasonic transmittance at the boundary between different media, impedance matching technology has been used. An impedance matching technology is a technology that increases the transmittance of ultrasonic waves by inserting a matching layer satisfying the quarter-wave impedance matching conditions into the boundary between the different media. Although this technology has been widely used for medical ultrasonic probes, industrial ultrasonic sensors, and the like, there is a limitation in that this technology is limitedly applied only to normally incident ultrasonic waves.

The above information disclosed in this Background section is only for enhancement of understanding of the background of the invention, and therefore it may contain information that does not form the prior art that is already known in this country to a person of ordinary skill in the art.

SUMMARY OF THE INVENTION

An exemplary embodiment has been made in an effort to provide matching media for perfect transmission of ultrasonic waves having advantages of facilitating perfect transmission of ultrasonic waves at a boundary between different elastic media through a matching layer provided at the boundary between the different elastic media.

An exemplary embodiment has also been made in an effort to provide matching media for perfect transmission of ultrasonic waves having advantages of facilitating effects such as miniaturization of a matching layer, reduction of manufacturing cost, improvement of manufacturability, and the like by proposing a matching layer having a single-layer structure of a simple single pattern that is easily fabricated.

An exemplary embodiment provides a matching medium for perfect transmission of ultrasonic waves including a matching layer configured to have a single pattern in a predetermined perfect transmission condition at a boundary between an incident medium and a transmission medium and perfectly transmit the ultrasonic waves incident from the incident medium to the transmission medium, wherein the matching layer may form the single pattern by controlling a plurality of predetermined design variables.

The single pattern may include semicircles at both ends of a rectangle in a longitudinal direction, and a plurality of single patterns are connected to each other along a longitudinal direction at predetermined rotational angles to have a Z shape.

The plurality of design variables may include a horizontal length $L_x$ of a unit structure, a vertical length $L_y$ of the unit structure, a width $2r$ of a unit pattern, a length $l_1$ of a first rectangle, a rotation angle $\theta_1$ of the first rectangle, a length $l_2$ of a second rectangle connected to one end of the first rectangle, a rotation angle $\theta_2$ of the second rectangle, a length $l_3$ of a third rectangle connected to one end of the second rectangle, and a rotation angle $\theta_3$ of the third rectangle.

The single pattern may be provided in a slit shape through mechanical processing.

The single patterns may be arranged in a row along a longitudinal direction of the matching layer.

The incident medium and the transmission medium may include different elastic media.

The matching layer may be in direct contact with an interface of the incident medium and an interface of the transmission medium between the incident medium and the transmission medium, respectively.

The matching layer may include an elastic metamaterial having a predetermined microstructure.

The ultrasonic waves may include in-plane waves propagated from an isotropic elastic medium under a plane-strain or plane-stress condition.

The plane waves may include a P wave as a longitudinal wave in which a propagation direction of the waves and a vibration direction of the medium are parallel to each other, and an SV wave as a transverse wave in which the propagation direction of the waves and the vibration direction of the medium are vertical to each other.

According to an exemplary embodiment, it is possible to facilitate perfect transmission of ultrasonic waves at the boundary between different elastic media and have effects such as miniaturization of a matching layer, reduction of manufacturing cost, improvement of manufacturability, and the like. Further, it is possible to perfectly transmit ultrasonic waves at the boundary between different media by using a matching layer with a simple structure that is easily processed.

DETAILED DESCRIPTION OF THE EMBODIMENTS

The terms used herein are for the purpose of describing specific exemplary embodiments only and are not intended to be limiting to the present invention. The singular forms used herein include plural forms as well if the phrases do not clearly have the opposite meaning. The term "comprising" used in the specification means that a specific feature, region, integer, step, operation, element and/or component is embodied, but the presence or addition of other specific features, regions, integers, steps, operations, elements, components, and/or groups is not excluded.

Unless defined otherwise, all terms including technical and scientific terms used herein have the same meaning as commonly understood by those skilled in the art to which the present invention belongs. Commonly used predefined terms are further interpreted as having a meaning consistent with the relevant technical literature and the present invention and are not to be construed as ideal or very formal meanings unless defined otherwise.

The present invention will be described more fully hereinafter with reference to the accompanying drawings, in which exemplary embodiments of the invention are shown. As those skilled in the art would realize, the described embodiments may be modified in various ways, all without departing from the spirit or scope of the present invention.

Figure 1:
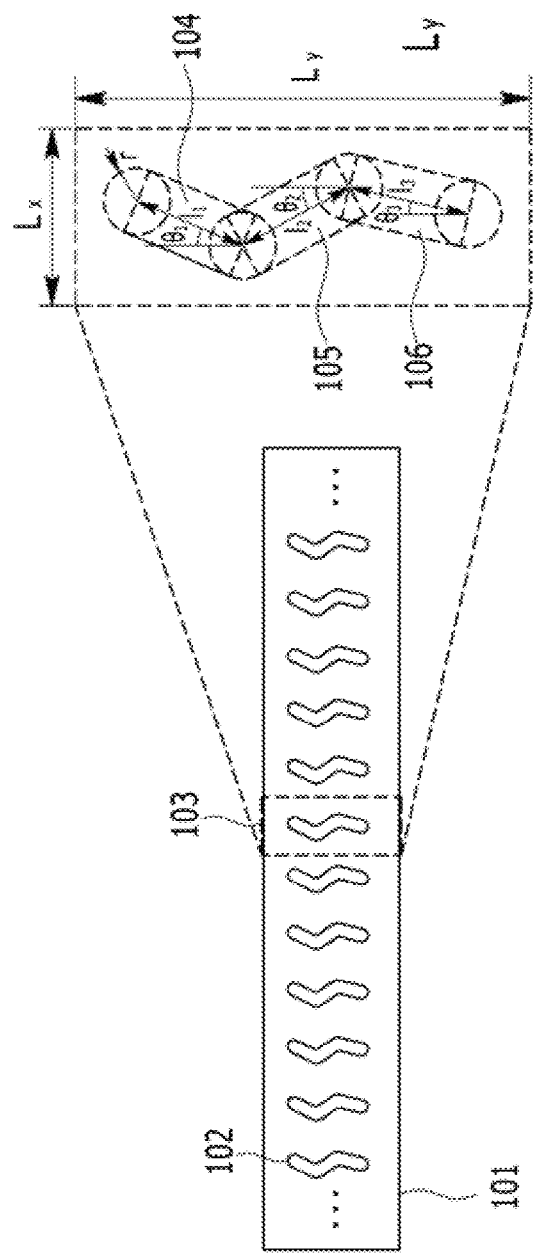
FIG. 1 is a diagram illustrating a matching medium for perfect transmission of ultrasonic waves according to an exemplary embodiment.

According to an exemplary embodiment, ultrasonic waves may be perfectly transmitted on a boundary between different elastic media by using the anisotropy of a matching layer having a single pattern inserted into the boundary between an incident medium and a transmission medium. There is a need for a new-shaped pattern capable of effectively controlling the anisotropy of the matching layer. The matching layer is provided with a single pattern in a predetermined perfect transmission condition at the boundary between the incident medium and the transmission medium to perfectly transmit the ultrasonic waves incident from the incident medium to the transmission medium. For example, the matching layer may be formed as a Z-shaped single pattern having a total of nine design variables. The single pattern may include semicircles at both ends of a rectangle in a longitudinal direction, and a plurality of single patterns are connected to each other along a longitudinal direction at predetermined rotational angles to have a Z shape. FIG. 1 illustrates a schematic diagram of a matching medium for perfect transmission of ultrasonic waves according to an exemplary embodiment.

Referring to FIG. 1, it can be seen that a matching layer 101 of a single pattern according to an exemplary embodiment is arranged in a row along a longitudinal direction of a matching medium. Design variables of the matching layer 101 having a Z-shaped single pattern 102 may include a horizontal length $L_x$ of a unit structure 103, a vertical length $L_y$ of the unit structure 103, a width 2r of a unit pattern 102, a length $l_1$ of a first rectangle 104, a rotation angle $\theta_1$ of the first rectangle 104, a length $l_2$ of a second rectangle 105 connected to one end of the first rectangle 104, a rotation angle $\theta_2$ of the second rectangle 105, a length $l_3$ of a third rectangle 106 connected to one end of the second rectangle 105, and a rotation angle $\theta_3$ of the third rectangle 106. A constituent material of the matching layer 101 may be freely selected, and the Z-shaped patterns may be provided as slit-shaped holes through mechanical processing.

When a total of nine design variables $L_x$, $L_y$, r, $l_1$, $l_2$, $l_3$, $\theta_1$, $\theta_2$, and $\theta_3$ are properly adjusted, a matching layer that perfectly transmits ultrasonic waves at a boundary between different elastic media may be designed. In an exemplary embodiment, it is assumed that the center of the second rectangle coincides with the center of the unit structure, and the constituent material of the matching layer 101 is the same as that of the incident medium.

According to an exemplary embodiment, when the matching layer 101 having a single pattern of a simple structure that is easily processed is used, ultrasonic waves may be perfectly transmitted at the boundary between different elastic media. Here, the perfect transmission means that the ultrasonic waves are transmitted from one medium to the other medium with 100% energy efficiency. In addition, the ultrasonic waves include a primary wave or pressure wave (P wave) and a secondary vertical wave or shear vertical wave (SV wave) which are in-plane waves propagated in an isotropic elastic medium under a plane-strain or plane-stress condition. At this time, the P wave is a longitudinal wave in which the propagation direction of the waves and a vibration direction of the medium are parallel to each other, and the SV wave is a shear wave or transverse wave in which the propagation direction of the waves and the vibration direction of the medium are vertical to each other.

The principle that the matching layer 101 inserted to the boundary between the different media perfectly transmits the ultrasonic waves is as follows. Inside the matching layer 101, a total of four wave modes, for example, a forward quasi-longitudinal wave mode (QL+ mode), a backward quasi-longitudinal wave mode (QL− mode), a forward quasi-shear wave mode (QS+ mode), and a backward quasi-shear mode (QS−mode) may be formed. At this time, an interference phenomenon occurs between the four wave modes formed inside the matching layer 101. Such appropriate wave interference inside the matching layer 101 transmits 100% of the wave energy incident on the boundary between different media without reflection.

According to an exemplary embodiment, in order to perfectly transmit the ultrasonic waves at the boundary between the different media, a mathematical condition that effective physical properties of the matching layer 101 inserted to the boundary thereof need to satisfy is presented. For example, for perfect transmission of ultrasonic waves, the matching layer 101 needs to satisfy a total of six conditions. These six conditions are divided into three generalized phase matching conditions and three generalized impedance matching conditions. The generalized phase matching conditions represent a relationship between wave numbers of the four wave modes formed inside the matching layer 101 and are expressed by Equation 1.

$$(k_{QL+}-k_{QL-})*d=l*\pi$$
$$(k_{QL+}-k_{QS+})*d=m*\pi$$
$$(k_{QL+}-k_{QS-})*d=n*\pi \quad \text{[Equation 1]}$$

($k_i$: wave number of i mode (i=QL+, QL−, QS+, QS−) formed inside the matching layer 101, d: thickness of the matching layer, l, m, n: any integer)

The generalized impedance matching conditions represent a relationship between the impedances of the matching layer 101, the incident medium, and the transmission medium, and are expressed by Equation 2.

$$Z_1=\text{sqrt}(\cos(2*\theta_{SV}))*Z_0$$
$$Z_2=\text{sqrt}(\tan(\theta_{SV}))*Z_0$$
$$Z_3=\text{sqrt}(\sin(2*\theta_{SV}))*Z_0 \quad \text{[Equation 2]}$$

($\theta_{SV}$: Refraction angle of transmitted transverse wave (SV wave), $Z_i$ (i=1, 2, 3, 4): generalized bimodal impedance)

While controlling a total of nine design variables that determine the shape of the single-pattern matching layer 101 according to an exemplary embodiment, the matching layer 101 that satisfies the total of six conditions described in Equations 1 and 2 is designed and thereafter, when the matching layer 101 is inserted to the boundary between the different elastic media, ultrasonic waves incident from one medium to the other medium may be perfectly transmitted.

As described above, the matching media for perfect transmission of ultrasonic waves according to an exemplary embodiment may perfectly transmit the ultrasonic waves at the boundary between the different elastic media. In addition, the matching layer 101 may include a Z-shaped single pattern having a total of nine design variables. The matching layer 101 may facilitate perfect transmission of ultrasonic waves through a simple structure that is easily processed. Accordingly, an exemplary embodiment may solve the problems of the related art in which many complex patterns need to be processed. In addition, an exemplary embodiment has effects of miniaturizing the matching layer 101, reducing the manufacturing cost of the matching layer 101, and increasing the manufacturability of the patterns of the matching layer 101. The exemplary embodiment may be applied to medical ultrasound technology and industrial ultrasound technology requiring high-energy ultrasonic waves.

Figure 2A:
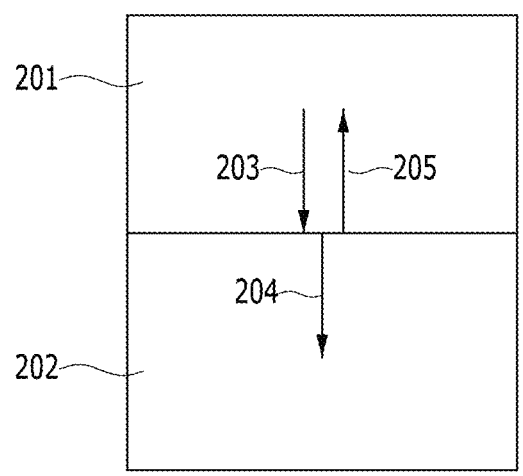
FIG. 2A is a diagram illustrating a situation in which ultrasonic waves that are normally incident on a boundary between different incident medium and transmission medium are transmitted and reflected.

According to an exemplary embodiment, there is presented a schematic diagram of the matching layer capable of perfectly transmitting the ultrasonic waves that are normally incident on the boundary between the different elastic media. When the ultrasonic waves are normally incident on the boundary between the different elastic media, generally, only some of the incident energy is transmitted and some thereof is reflected, and a schematic diagram thereof is illustrated in FIG. 2A. At this time, if the engineering-designed matching layer according to an exemplary embodiment is inserted into the boundary between the different elastic media, all the wave energy that is normally incident may be transmitted. A schematic diagram thereof is illustrated in FIG. 2B.

FIG. 2A illustrates a situation in which ultrasonic waves normally incident on a boundary between different incident medium 201 and transmission medium 202 are transmitted and reflected. Here, an incident ultrasonic wave 203 may be both a P wave and an SV wave. As illustrated in FIG. 2A, since both a transmitted ultrasonic wave 204 and a reflected ultrasonic wave 205 are generally generated at the boundary between different media, perfect transmission of the ultrasonic waves is impossible. In the case of normal incidence, when the matching layer is not inserted, the wave modes of the incident ultrasonic wave 203, the transmitted ultrasonic wave 204, and the reflected ultrasonic wave 205 are always the same.

Figure 2B:
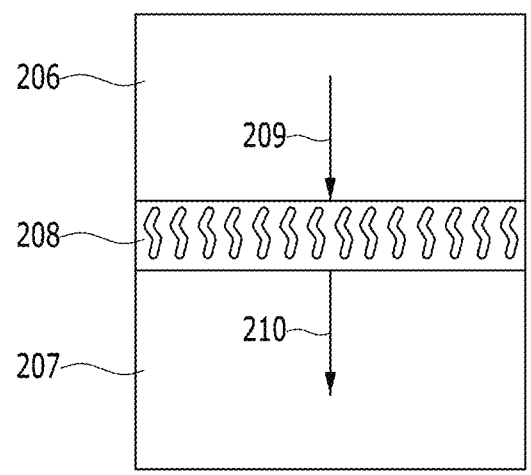
FIG. 2B is a diagram illustrating a situation in which normally incident ultrasonic waves are perfectly transmitted when a matching layer according to an exemplary embodiment is inserted to a boundary between different incident medium and transmission medium.

FIG. 2B illustrates a situation in which normally incident ultrasonic waves are perfectly transmitted when an engineering-designed matching layer 208 is inserted into a boundary between different incident medium 206 and transmission medium 207 according to an exemplary embodiment. Here, a wave mode of an incident ultrasonic wave 209 may be both a P wave and an SV wave, and a wave mode of a transmitted ultrasonic wave 210 may be both a P wave and an SV wave. Only the transmitted ultrasonic wave 210 may be generated without unwanted reflected ultrasonic wave, and a wave mode of the transmitted ultrasonic wave 210 may be selected as a wave mode that is the same as or different from that of the incident ultrasonic wave 209 according to a design of the matching layer. The matching layer 208 may be in direct contact with an interface of the incident medium 206 and an interface of the transmission medium 207 between the incident medium 206 and the transmission medium 207, respectively. In addition, the matching layer 208 may include an elastic metamaterial having a predetermined microstructure.

Figure 3A:
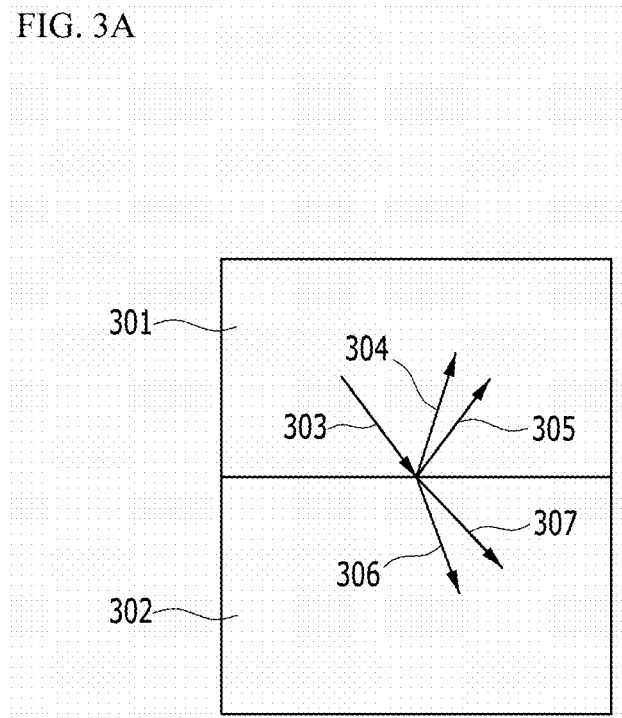
FIG. 3A is a diagram illustrating a situation in which ultrasonic waves incident obliquely on a boundary between different incident medium and transmission medium are transmitted and reflected.

According to an exemplary embodiment, there is presented a schematic diagram of a matching layer capable of perfectly transmitting ultrasonic waves obliquely incident on a boundary between different elastic media. When the ultrasonic waves are obliquely incident on the boundary between the different elastic media, in general, only some of the incident energy is transmitted and some thereof is reflected. A difference from the case where the ultrasonic waves are normally incident is that both the P wave and the SV wave are transmitted and reflected. A schematic diagram thereof is illustrated in FIG. 3A. At this time, when an engineering-designed matching layer according to an exemplary embodiment is inserted into a boundary between different elastic media, all of wave energy incidents obliquely may be transmitted. A schematic diagram thereof is illustrated in FIG. 3B.

FIG. 3A illustrates a situation in which ultrasonic waves incident obliquely on the boundary between different incident medium 301 and transmission medium 302 are transmitted and reflected. Here, an incident ultrasonic wave 303 may be both a P wave and an SV wave and is assumed as a P wave. In general, the incident ultrasonic wave 303 incident obliquely generates all of a reflected SV wave 304, a reflected P wave 305, a transmitted SV wave 306, and a transmitted P wave 307. Reflection angles of the reflected waves 304 and 305 and refraction angles of the transmitted waves 306 and 307 are determined by the Snell's law, and amplitudes of the reflected and transmitted waves are determined by the Fresnel equations.

Figure 3B:
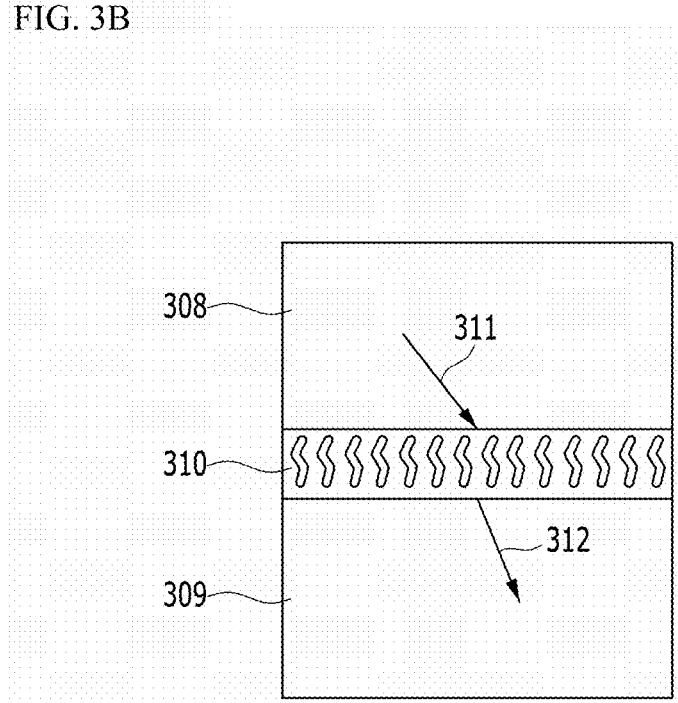
FIG. 3B is a diagram illustrating a situation in which obliquely incident ultrasonic waves are perfectly transmitted when a matching layer according to an exemplary embodiment is inserted to a boundary between different incident medium and transmission medium.

FIG. 3B illustrates a situation in which obliquely incident ultrasonic waves are perfectly transmitted when an engineering-designed matching layer 310 is inserted into the boundary between different incident medium 308 and transmission medium 309. Here, a wave mode of an incident ultrasonic wave 311 may be both a P wave and an SV wave, and a wave mode of a transmitted ultrasonic wave 312 may be both a P wave and an SV wave. At this time, the incident ultrasonic wave 311 is perfectly transmitted by the matching layer 310 inserted into the boundary between the two different media, and then, only the transmitted ultrasonic wave 312 is generated. The wave mode of the transmitted ultrasonic wave 312 may be selected as the same or different wave mode as or from that of the incident ultrasonic wave 311 according to the design of the matching layer.

Meanwhile, as illustrated in FIG. 1, the matching layer 101 according to an exemplary embodiment includes a total of nine design variables $L_x$, $L_y$, r, $l_1$, $l_2$, $l_3$, $\theta_1$, $v_2$, and $\theta_3$. When a design system is decided, for example, when the incident medium, the transmission medium, the incidence angle of the incident ultrasonic wave, the frequency of the incident ultrasonic wave, the wave mode of the incident ultrasonic wave, and the wave mode of the transmitted ultrasonic wave are determined, in the case where the design variables of the matching layer 101 are designed and the matching layer 101 is inserted to the boundary between the different elastic media, as illustrated in FIGS. 2 and 3, the ultrasonic waves that are normally or obliquely incident from one medium to the other medium may be perfectly transmitted.

Figure 4A:
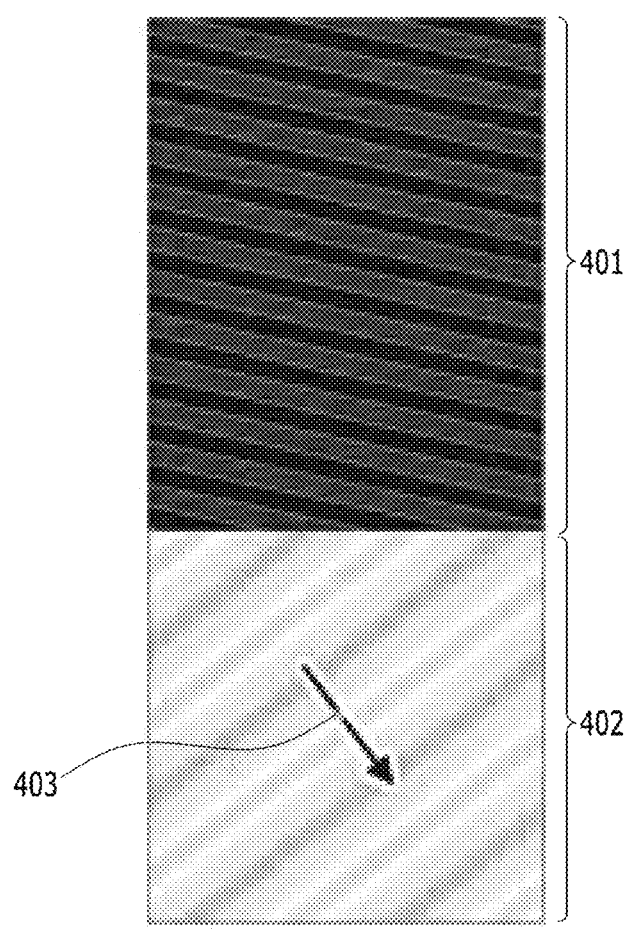
FIG. 4A is a diagram illustrating a curl field $\nabla \times \vec{u}$ of a displacement when different incident medium and transmission medium are in contact with each other.

An exemplary embodiment provides a structure of a matching layer that perfectly transmits ultrasonic waves obliquely incident on the boundary between the different elastic media and a simulation analysis result. In an exemplary embodiment, it is assumed that PEEK is an incident medium, and iron is a transmission medium. It is assumed that a P wave having a frequency of 100 kHz is obliquely incident to the boundary between the two media at an incident angle of 30° to be transmitted as an SV wave. A simulation analysis result for a case in which there is no matching layer according to an exemplary embodiment is illustrated in FIG. 4A. A simulation analysis result for a case in which there is a matching layer according to an exemplary embodiment is illustrated in FIG. 4B.

FIG. 4A illustrates a curl field $\nabla \times \vec{u}$ of a displacement when different incident medium 401 and transmission medium 402 are in contact with each other. The curl field of the displacement is proportional to the amplitude of an SV wave and independent of the amplitude of a P wave. At this time, since a significant amount of unwanted reflection occurs in the incident medium 401, it is confirmed that the intensity of an SV wave 403 transmitted to the transmission medium 402 is small.

Figure 4B:
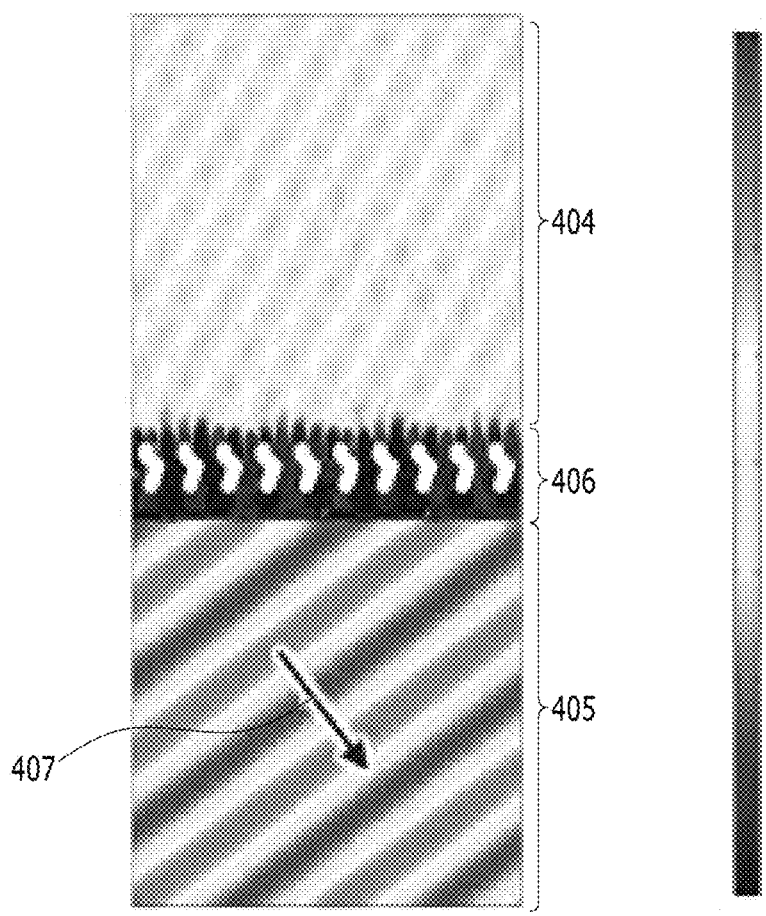
FIG. 4B is a diagram illustrating a curl field $\nabla \times \vec{u}$ of a displacement when a matching layer according to an exemplary embodiment is inserted to a boundary between different incident medium and transmission medium.

FIG. 4B illustrates a curl field $\nabla \times \vec{u}$ of a displacement when a matching layer 406 according to an exemplary embodiment is inserted into a boundary between different incident medium 404 and transmission medium 405. At this time, it is confirmed that an SV wave 407 which is not almost reflected to the incident medium 404 but transmitted to the transmission medium 405 is greatly amplified.

An exemplary embodiment may be utilized in the development of high-efficiency wave equipment because the ultrasonic waves may be perfectly transmitted at the boundary between different elastic media by using a matching layer of a single pattern. For example, an exemplary embodiment may be directly used for medical ultrasound treatment, diagnosis, imaging, or industrial ultrasound non-destructive testing, in which it is very important to transmit high-energy ultrasonic waves. For example, the matching layer according to an exemplary embodiment may be utilized as a high-efficiency medical ultrasonic probe used for medical ultrasound treatment, diagnosis, imaging, and the like. The medical ultrasonic probe is a device for treating, diagnosing, or imaging the desired area by transmitting ultrasonic waves to the body tissue. When the ultrasonic waves are transmitted from the probe to the body tissue, it is difficult to analyze an ultrasonic signal because the transmittance is generally very low. Therefore, it is very important to transmit high-intensity ultrasonic waves to the body tissue.

In the related art, an impedance matching layer was used to increase the ultrasonic transmittance, but it was difficult to completely implement the impedance matching between the probe and the body tissue by using only materials existing in nature.

In the case of using the matching layer according to an exemplary embodiment, matching layers made of various materials may be used, thereby minimizing the size of the matching layer and reducing manufacturing costs while maximizing the ultrasonic transmittance to the body tissue. A schematic diagram thereof is illustrated in FIG. 5.

Figure 5:
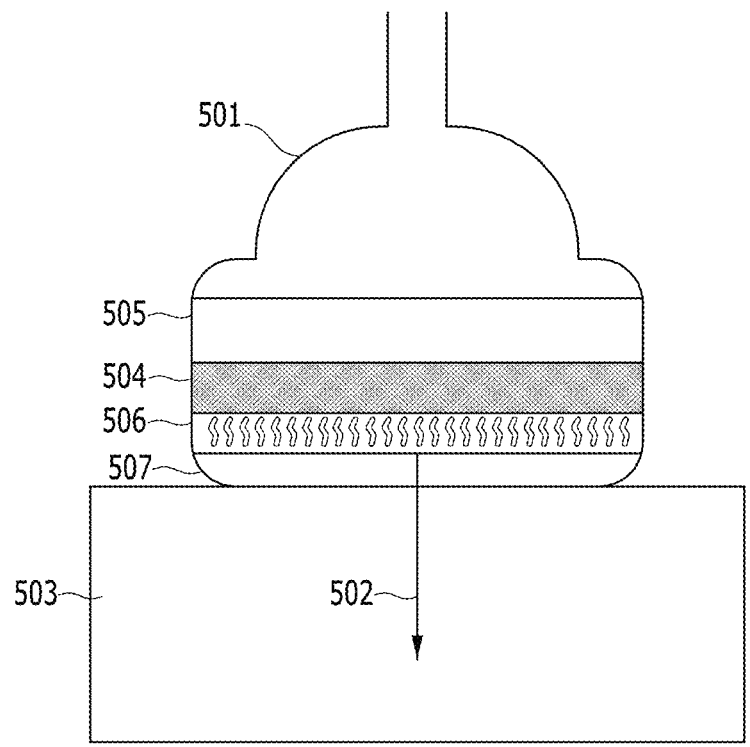
FIG. 5 is a diagram illustrating a situation in which ultrasonic waves generated from a medical ultrasonic probe are transmitted into a body tissue.

FIG. 5 illustrates a situation in which an ultrasonic wave 502 generated by a medical ultrasonic probe 501 is transmitted to the body tissue 503. The medical ultrasonic probe 501 includes a transducer 504 for generating ultrasonic waves, a backing layer 505 for absorbing the ultrasonic waves, a matching layer 506 for increasing an ultrasonic transmittance, and an acoustic lens 507 for focusing the ultrasonic waves to a specific point. When the matching layer 506 according to an exemplary embodiment is used, the ultrasonic waves may be perfectly transmitted to the body tissue 503, so ultrasonic signal analysis is advantageous.

A matching medium for perfect transmission of ultrasonic waves according to an exemplary embodiment may be utilized as a high-efficiency wedge used for industrial ultrasonic non-destructive testing and the like, and a schematic diagram thereof is illustrated in FIG. 6.

Figure 6A:
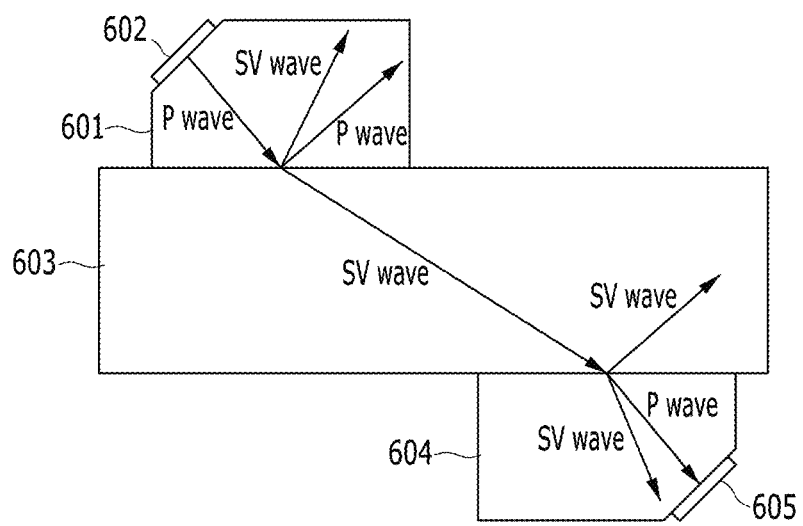
FIG. 6A is a diagram illustrating a situation in which ultrasonic waves generated from a transducer of a transmission wedge pass through a specimen to reach a transducer of a reception wedge.

In the case of the related art, as illustrated in FIG. 6A, the ultrasonic transmittance at the boundary between the wedge and a specimen is low, so the magnitude of a reception signal is very small. However, when the matching medium for perfect transmission of ultrasonic waves according to an exemplary embodiment is used, the ultrasonic waves may be perfectly transmitted at the boundary between the wedge and the specimen as illustrated in FIG. 6B, so that the magnitude of the received signal may be maximized.

FIG. 6A illustrates a situation in which ultrasonic waves are generated from a transducer 602 of a transmission wedge 601 by using the related art pass through a specimen 603 to reach a transducer 605 of a reception wedge 604. The transducer 602 of the transmission wedge 601 generates a P wave, and the transducer 605 of the reception wedge 604 analyzes a received P-wave signal. The P wave generated from the transducer 602 of the transmission wedge 601 is partially reflected and partially transmitted at the boundary with the specimen. At this time, only an SV wave exists as an ultrasonic wave transmitted by a critical angle of Snell. The transmitted SV wave is partially reflected and partially transmitted at the boundary between the reception wedge 604 and the specimen 603. At the boundary between the transmission wedge 601 and the reception wedge 604 and the specimen 603, a lot of unwanted reflection occurs, and the transmittance is low, so that a reception signal is very small.

Figure 6B:
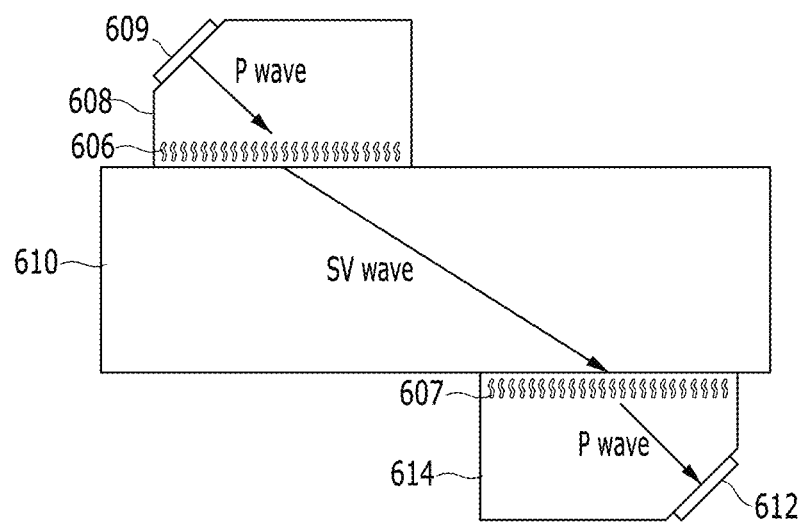
FIG. 6B is a diagram illustrating a situation in which ultrasonic waves generated from a transducer of a transmission wedge reach a transducer of a reception wedge through a specimen by using a matching layer according to an exemplary embodiment.

FIG. 6B illustrates a situation in which ultrasonic waves generated from a transducer 609 of a transmission wedge 608 using matching layers 606 and 607 according to an exemplary embodiment pass through the specimen 610 to reach a transducer 612 of a reception wedge 611. The transducer 609 of the transmission wedge 608 generates a P wave, and the transducer 612 of the reception wedge 611 analyzes a received P wave signal. The P wave generated from the transducer 609 of the transmission wedge 608 is perfectly transmitted without reflection to the specimen 610 by the matching layer 606. Even at the boundary between the reception wedge 611 and the specimen 610, the P wave is perfectly transmitted without reflection to the reception wedge 611 by the matching layer 607. In the case of using the matching layers according to an exemplary embodiment, the ultrasonic waves may be perfectly transmitted at the boundary between the transmission wedge 608 and the reception wedge 611 and the specimen 610, thereby maximizing the magnitude of the reception signal.

In order to verify this result, a simulation analysis is performed using commercial software (COMSOL Multiphysics), and the result is illustrated in FIG. 7. In the simulation, the material of the wedge is set to PEEK and the material of the specimen is set to iron.

Figure 7A:
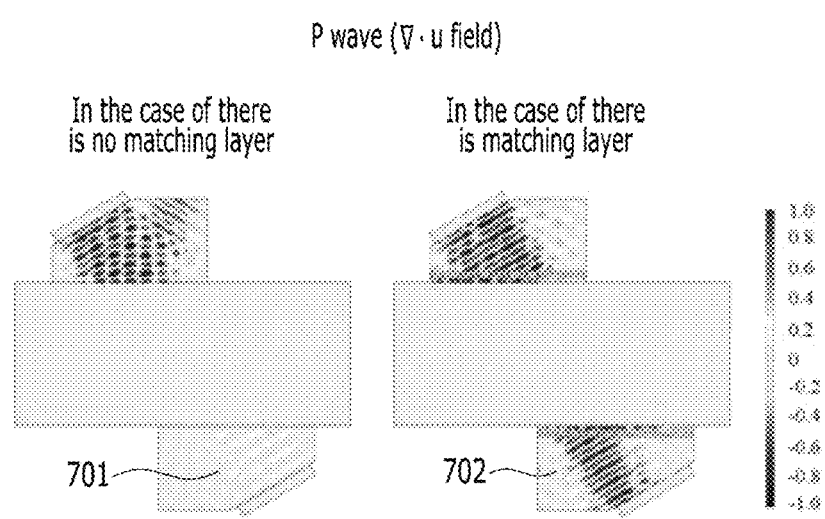
FIG. 7A is a diagram illustrating a divergence field $\nabla^* \vec{u}$ of a displacement according to the presence or absence of a matching layer.

FIG. 7A illustrates a divergence field $\nabla^* \vec{u}$ of a displacement according to the presence or absence of a matching layer. The divergence field of the displacement is proportional to the amplitude of a P wave and independent of the amplitude of an SV wave. When there is no matching layer, it is confirmed that the intensity of a P wave 701 propagating from a reception wedge is weak. In the case of performing ultrasonic non-destructive testing in the related art, the intensity of a reception signal is small. On the other hand, when there is the matching layer, it can be seen that the intensity of a P wave 702 propagating from the reception wedge is relatively increased. Accordingly, if the ultrasonic non-destructive test is performed using the matching layer according to an exemplary embodiment, there is an advantage to maximizing the intensity of the reception signal.

Figure 7B:
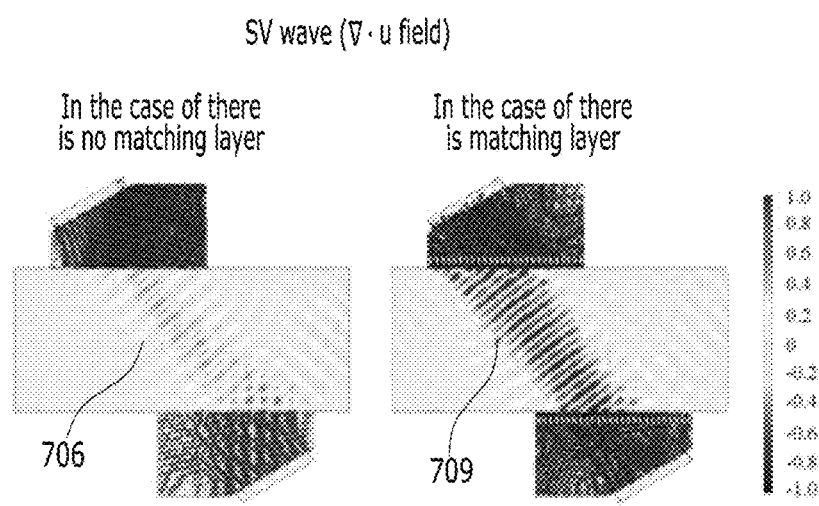
FIG. 7B is a diagram illustrating a curl field $\nabla \times \vec{u}$ of a displacement according to the presence or absence of a matching layer.

FIG. 7B illustrates a curl field $\nabla \times \vec{u}$ of a displacement according to the presence or absence of the matching layer. The curl field of the displacement is proportional to the amplitude of an SV wave and independent of the amplitude of a P wave. When there is no matching layer, it is confirmed that since unwanted reflection occurs at the boundary between a wedge and a specimen, the intensity of an SV wave 706 propagating from the specimen is weak. On the other hand, when there is a matching layer, it is confirmed that ultrasonic waves are perfectly transmitted at the boundary between the wedge and the specimen, so that the intensity of an SV wave 709 propagating from the specimen is relatively increased.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A matching medium for perfect transmission of ultrasonic waves comprising:
   a matching layer configured to have a single pattern in a predetermined perfect transmission condition at a boundary between an incident medium and a transmission medium and perfectly transmit the ultrasonic waves from the transmission medium to the incident medium,
   wherein the single pattern is formed by controlling a plurality of predetermined design variables, and
   wherein the single pattern includes semicircles at both ends of a rectangle in a longitudinal direction, and a plurality of single patterns are connected to each other along a longitudinal direction at predetermined rotational angles to have a Z shape.

2. The matching medium for perfect transmission of ultrasonic waves of claim 1, wherein:
   the plurality of design variables include a horizontal length Lx of a unit structure, a vertical length Ly of the unit structure, a width 2r of a unit pattern, a length l1 of a first rectangle, a rotation angle θ1 of the first rectangle, a length l2 of a second rectangle connected to one end of the first rectangle, a rotation angle θ2 of the second rectangle, a length l3 of a third rectangle connected to one end of the second rectangle, and a rotation angle θ3 of the third rectangle.

3. The matching medium for perfect transmission of ultrasonic waves of claim 1, wherein:
   the single pattern is provided in a slit shape through mechanical processing.

4. The matching medium for perfect transmission of ultrasonic waves of claim 1, wherein:
   the single patterns are arranged in a row along a longitudinal direction of the matching layer.

5. The matching medium for perfect transmission of ultrasonic waves of claim 1, wherein:
   the incident medium and the transmission medium include different elastic media.

6. The matching medium for perfect transmission of ultrasonic waves of claim 1, wherein:
   the matching layer is in direct contact with an interface of the incident medium and an interface of the transmission medium between the incident medium and the transmission medium, respectively.

7. The matching medium for perfect transmission of ultrasonic waves of claim 1, wherein:
   the matching layer includes an elastic metamaterial having a predetermined microstructure.

8. The matching medium for perfect transmission of ultrasonic waves of claim 1, wherein:
   the ultrasonic waves include in-plane waves propagated from an isotropic elastic medium under a plane-strain or plane-stress condition.

9. The matching medium for perfect transmission of ultrasonic waves of claim 8, wherein:
   the plane waves include
   a P wave as a longitudinal wave in which a propagation direction of the waves and a vibration direction of the medium are parallel to each other, and
   an SV wave as a transverse wave in which the propagation direction of the waves and the vibration direction of the medium are vertical to each other.

\* \* \* \* \*